March 29, 1966    L. B. THWAITES    3,243,064
MOUNTING OF FLUID-OPERATED IMPLEMENTS ON VEHICLES
Filed Feb. 14, 1963    2 Sheets-Sheet 1
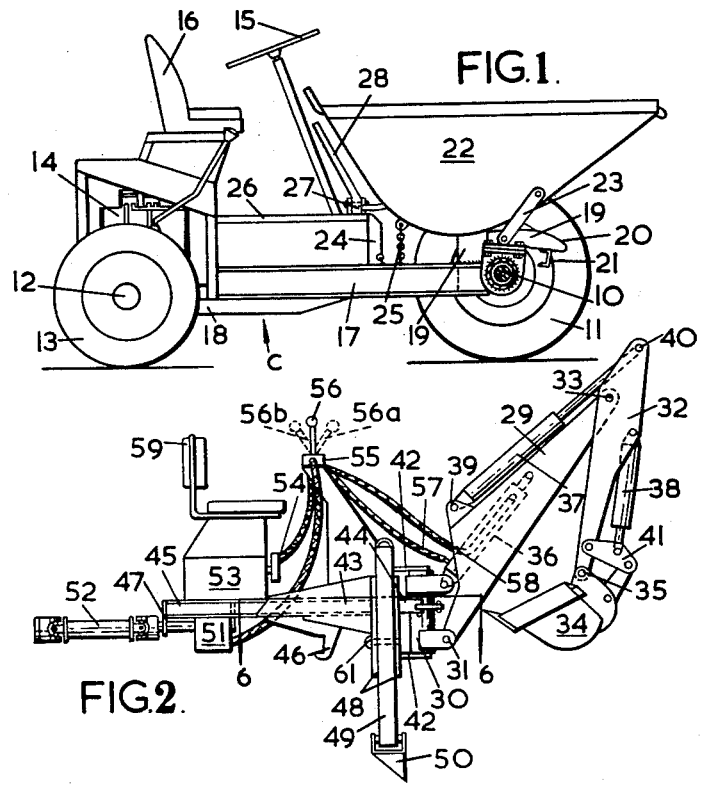
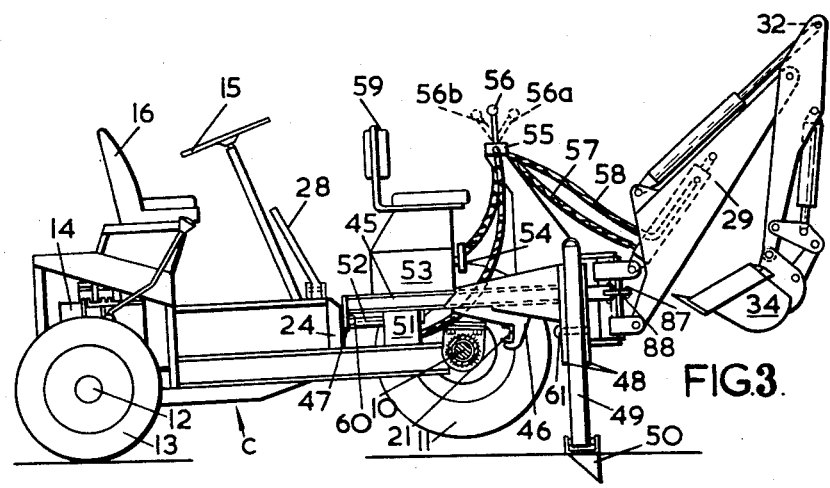

United States Patent Office 3,243,064
Patented Mar. 29, 1966

3,243,064
MOUNTING OF FLUID-OPERATED IMPLEMENTS ON VEHICLES
Leslie Basil Thwaites, c/o The Thwaites Engineering Company Limited, Welch Road, Cubbington, near Leamington Spa, England
Filed Feb. 14, 1963, Ser. No. 258,561
Claims priority, application Great Britain, Feb. 20, 1962, 6,447/62
3 Claims. (Cl. 214—138)

The invention relates to improvements in the mounting of a fluid-operated implement on a vehicle of the kind having road wheels and a power take-off driven by a prime mover carried by the vehicle chassis frame and is particularly useful in mounting an implement such as a back hoe to a dirigible dumper in place of its skip. An object is to provide a fluid-operated implement which can be mounted on, or detached from, a vehicle without disturbing the circuit of its operating fluid.

In recent years the number of fluid-operated implements used, for instance by civil engineering undertakings and in agriculture, has greatly increased. A large number of such implements are either self-contained or permanently associated with particular vehicles. The operator of such implements consequently has to keep a large selection of individual machines of which only a small proportion are in use at any particular time.

So as to cut down the waste involved in keeping expensive machinery idle, some manufacturers have provided dirigible vehicles which have an interchangeable selection of fluid-operated implements. These implements have invariably been supplied with energised fluid by a pump fixed to the vehicle so that when one implement is changed for another one, it is necessary to disconnect all fluid-pressure lines between the vehicle and the implement that is to be taken off, and to connect the fluid-pressure lines of the substitute implement to the lines coming from the vehicle. Apart from the work required for effecting the change of line connections from one implement to another it is necessary in the case of oil-operated implements to bleed the fluid circuit to dispose of trapped air. If such a change-over is made on the site, there is a grave danger of dirt or abrasive dust being drawn into the pressure lines. An additional disadvantage of this system is that it is difficult to substitute an implement which is not operated by fluid-pressure for one which is so operated as the fluid lines coming from the vehicle have to be blocked.

This invention provides an implement which can be mounted on or detached from a vehicle, which has an engine for providing the power to energise the fluid for operating the implement, without the above-mentioned difficulties or dangers.

According to the invention a fluid-operated implement is carried by a support frame which is adapted to be detachably secured to a vehicle of the kind set forth and carries a pump for energizing the operating fluid for the implement, the pump having a power input member for being driven by the power take-off of the vehicle when the support frame is secured to the vehicle, the fluid circuit for the implement being carried entirely by the support frame whereby the implement may be completely removed from the vehicle without disconnecting any part of the fluid circuit.

When the implement is for attachment to a vehicle at a position that is remote from the driving seat, a seat for the operator of the implement is, according to a feature of the invention, carried by the support frame in a position convenient for observing the operation of the implement, and a control for the implement is carried by the support frame in a position within convenient reach of the seat for the operator.

In the case where the implement is of the kind which is to be supported from the ground by a jack during use and is mounted at one end of the support frame, the end of the support frame remote from the implement is, according to another feature, provided with means for detachably securing it to the vehicle chassis frame, the support frame intermediate its ends is provided with a member for reacting upwardly on the vehicle chassis frame, and the jack is carried by the support frame in such a position that it will engage the ground at a point lying outside the wheel-base of the vehicle whereby to increase the stabilising couple of the vehicle on the implement when the latter is operating.

The invention also comprehends the combination of a fluid-operated implement, carried by a support frame, with a vehicle of the kind set forth, the power take-off being connected to drive a pump carried by the support frame, and the implement and the associated support frame being detachable from the vehicle without disconnecting any fluid-pressure lines.

One specific embodiment of the invention is described with reference to the accompanying drawings, in which:

FIGURE 1 is an elevation of a dumper and its associated skip, with the front right-hand wheel cut away;

FIGURE 2 is an elevation of a fluid-operated back hoe (that is a trench-digging implement) for mounting on the dumper shown in FIGURE 1 in place of the skip;

FIGURE 3 shows the back hoe of FIGURE 2 attached to the dumper of FIGURE 1 in place of the skip;

Figure 4:
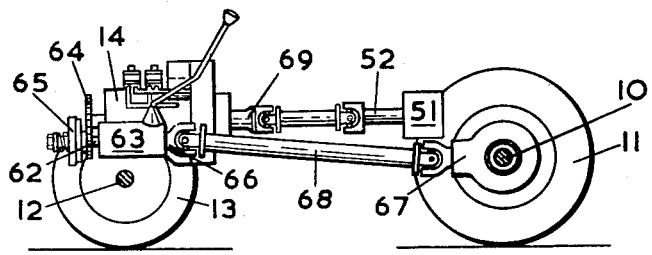
FIGURE 4 shows the transmission system of the dumper of FIGURE 1 and illustrates the drive between the dumper and the pump for supplying the back hoe with energised fluid.

Referring to FIGURE 1, the dumper comprises a chassis frame, indicated generally by arrow C, connected to a front axle 10 having wheels 11, and to a rear axle 12 having wheels 13. An engine 14 at the rear of the dumper is arranged, in a manner that will be described later with reference to FIGURE 4, to drive the front axle 10 and hence the front wheels 11. The rear wheels 13 are steerable and are linked to a steering wheel 15 so that a person sitting in the driver's seat 16 may direct the vehicle. Each longitudinal side of the chassis frame C comprises a girder 17 which is secured to a frame member 18 for supporting the rear axle 12 and to a plate 19 having a curved top face 20. The longitudinal sides are joined together at their front ends by a transverse member 21, and elsewhere by further transverse members which are not shown. A skip 22 rests on the curved top face 20 and is connected to the plate 19 by a pivoted link 23, to an upright 24 fast with girder 17 by a chain 25, and to a frame member 26 fast with the upright 24 by a catch 27. The skip 22 and the curved top face 20 of plate 19 are so arranged that, when catch 27 is released by the driver operating a lever 28, the skip will tip forwards under the guidance of link 23 and chain 25 and discharge its contents.

In FIGURE 2 the back hoe comprises a main boom 29 supported from a slewing frame 30 by a transverse pin 31, a tool beam 32 carried by a transverse pin 33 at the end of the main boom 29, and a digging tool 34 carried by a transverse pin 35 at the end of the tool beam 32. A double-acting ram 36 is connected between the top of the slewing frame 30 and the middle portion of the main boom 29 for articulating the main boom about pin 31. Double-acting rams 37 and 38 are arranged respectively between a bracket 39 of the main boom 29 and the end 40 of the tool beam 32 whereby to articulate the tool beam relatively to the main boom about pin 33, and between the tool beam 32 and a linkage 41 connected to the digging tool 34 whereby to articulate the latter relatively to the tool beam about the pin 35. The slewing frame 30 is supported by brackets 42 from a support frame 43 and can be orientated about its vertical axis by single-acting rams 44, described later with reference to FIGURE 6, whereby to slew the back hoe relatively to the support frame 43.

The support frame 43 has longitudinal side members 45 which are both provided with a hook member 46 and an end plate 47. The end of the support frame remote from the end plates 47 has, on each longitudinal side, a guide 48 for respective jack legs 49 having pivoted feet 50. A pump 51 is mounted on the support frame between the longitudinal side members 45 and has a power input shaft 52. The pump 51 is connected in closed circuit with a reservoir 53 supported by the longitudinal side members 45, a filter 54, and a control panel 55. The latter comprises a number of control valves, described later with reference to FIGURES 5 and 6, having respective control levers 56 for operating the rams 36, 37, 38 and 44. The control valves are connected to their respective rams by flexible hoses 57 and 58, the hoses to ram 36 only being shown in order to simplify the drawing. Each control lever 56 and its associated control valve are so arranged that, when the control lever is moved to position 56a the associated hoses 57 and 58 are connected to the fluid pressure supply and to exhaust respectively, that when the control lever is moved to position 56b the connections of the hoses are reversed, and that when the control lever is in the intermediate position indicated by full lines the hoses are blocked so that the associated ram is hydraulically locked. A seat 59 for the operator of the back hoe is secured to the top of the reservoir 53.

It will be appreciated that the skip 22, shown in FIGURE 1, can readily be removed from the dumper by detaching chain 25 from upright 24, by disconnecting pivoted link 23, and by operating lever 28 to release catch 27. After the skip 22 has been removed, the back hoe can be secured to the chassis frame C as is shown in FIGURE 3. In that figure, hook members 46 engage underneath transverse member 21, and end plates 47 are secured to uprights 24 by bolts 60. The power input shaft 52 of the pump 51 is connected to be driven by the engine 14 of the dumper as will be described later with reference to FIGURE 4. In this condition the feet 50 do not engage the ground and the dumper may be moved from place to place with the back hoe attached.

During use a back hoe must be supported firmly from the ground and this is achieved in the following manner. After the back hoe has been correctly positioned relatively to the ground that it is to work on, the rams 44 are operated to slew the back hoe until it is directed transversely to one side of the dumper, say the right-hand side. With the slewing rams 44 locked in this position the ram 36 is operated until the back of the digging tool 34 bears on the ground and jacks the right-hand front wheel 11 off the ground. When the wheel is sufficiently off the ground the ram 36 is locked and pin 61, which normally locates the right-hand jack leg 49 axially in its guide 48, is withdrawn allowing the jack leg 49 to slide downwardly until its foot 50 engages the ground. The pin 61 is now replaced and the ram 36 is operated so that the weight of the dumper and the back hoe is transferred from the digging tool 34 to the right-hand jack leg 49. The rams 44 are then operated until the back hoe is slewed until it is directed transversely to the left-hand side of the dumper, and the left-hand jack leg 49 is lowered in the same manner as the right-hand jack leg. FIGURE 3 shows the dumper after the jacking operation has been completed and it will be noted that, as well as supporting the back hoe firmly from the ground, the jack legs 49 are positioned so that the stabilising couple exerted by the dumper on the back hoe is considerably increased. It will also be noted that the seat 59 enables the operator of the back hoe to observe the operation of the digging tool 34 whereas, if seat 16 had been used, the operation of the digging tool would have been obscured.

In FIGURE 4 the engine 14 drives the input shaft 62 of a change-speed gear box 63 through a chain drive 64 and a drum clutch 65. The output shaft 66 of the gear box 63 is connected to drive the differential unit 67 of the front axle 10 through a transmission shaft 68. The end of the engine 14 remote from the chain drive 64 is arranged to drive a power take-off 69. It will be appreciated from FIGURE 4 that, when the back hoe is attached to the dumper, the power input shaft 52 of the pump 51 will be connected as shown to be driven from the power take-off 69.

Figure 5:
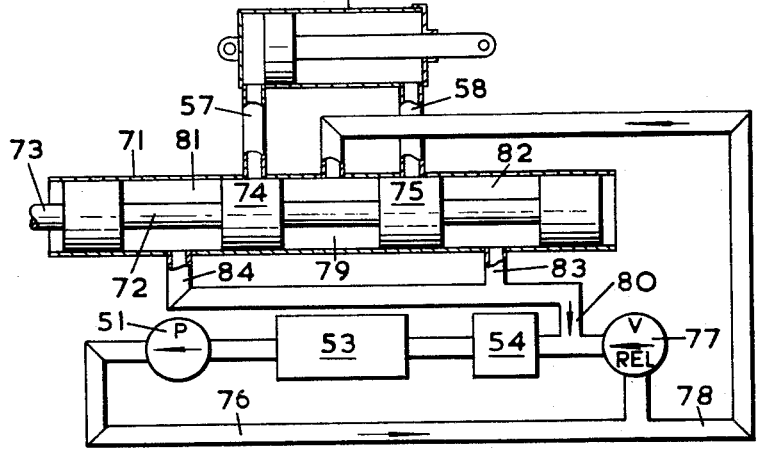
FIGURE 5 shows diagrammatically the main fluid circuit of the back hoe and its connection with the circuit of one of the double-acting fluid-operated rams.

The fluid circuit for ram 36 is illustrated in FIGURE 5. In that figure the control valve 71 has a spool 72 which is formed integral with an extension 73 to be operated by the associated control level 56. The spool 72 is shown in the position in which ram 36 is hydraulically locked by pistons 74 and 75 blocking the hoses 57 and 58. In this position the pump 51 draws oil from reservoir 53 and delivers it, through pipe 76, relief valve 77, filter 54, and back to the reservoir 53. Oil does not flow from pipe 76 to pipe 78 as gallery 79 has its outlets to hoses 57 and 58 blocked by pistons 74 and 75, and it does not flow from the relief valve 77 to pipe 80 as galleries 81 and 82 have their communications with hoses 57 and 58 respectively blocked by pistons 74 and 75.

Extension 73 is connected to its control lever 56 so that, when the latter is in the position shown in full lines in FIGURES 2 and 3, the spool 72 is in the position shown in FIGURE 5. When the control lever is moved to position 56a in FIGURES 2 and 3, the spool 72 is moved to the left in FIGURE 5 so that piston 74 allows fluid under pressure to flow from pipe 76, through pipe 78 and gallery 79 to hose 57. At the same time piston 75 allows fluid from hose 58 to flow through gallery 82, pipes 83 and 80, and filter 54 to reservoir 53. Under these conditions it will be appreciated that the length of the ram will increase and the main boom 29 will be lowered.

When the control lever is moved to position 56b in FIGURES 2 and 3, the spool 72 is moved to the right in FIGURE 5 so that piston 75 allows fluid under pressure to flow from pipe 76, thorugh pipe 78 and gallery 79 to hose 58. At the same time piston 74 allows fluid from hose 57 to flow through gallery 81, pipes 84 and 80, and filter 54 to reservoir 53. Thus, the connections of ram 36 are reversed so that the length of the ram will decrease and the main boom will be raised.

Double-acting rams 37 and 38 are operated in exactly the same manner as ram 36, and are each provided with a separate control lever 56 and control valve 71 which is identical to that described with reference to FIGURE 5. It will be appreciated that all the rams will be supplied by the same pump 51 and will share the reservoir 53, the filter 54 and the relief valve 77, that the control valves 71 will be arranged in parallel between pipes 78 and 80, and that the maximum pressure in each ram will be determined by the setting of the relief valve 77.

If desired, the fluid circuit may be modified in a known manner so that the relief valve 77 is short-circuited when all the control levers 56 are in their central full line positions whereby to minimise the power required to drive the pump when the back hose is not operative.

Figure 6:
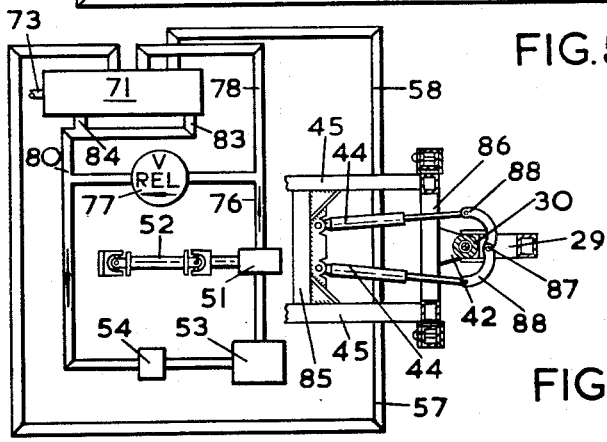
FIGURE 6 is a section taken on the line 6—6 of FIGURE 2 showing the slewing mechanism of the back hoe and illustrating diagrammatically how it is controlled from the main fluid circuit of FIGURE 5.

In FIGURE 6 the longitudinal side members 45 of the support frame are braced by transverse members 85 and 86. Single-acting rams 44 are pivoted to transverse member 85 and are connected to a crank pin 87 fast with the slewing frame 30 by curved links 88. The rams 44 are controlled by the same type of circuit as that shown in FIGURE 5, excepting that the hoses 57 and 58 are connected to separate rams. It will accordingly be appreciated that, when hose 57 is connected by control valve 71 to pressurised oil from pipe 78 and hose 58 is connected to exhaust through pipe 80, the main boom 29 will slew counter-clockwise about the axis of the slewing frame 30, and that, when the connections to hoses 57 and 58 are reversed the main boom 29 will slew clockwise.

What I claim as my invention and desire to secure by Letters Patent of the United States is:

1. An attachment for a vehicle which is provided with a chassis frame, road wheels and a prime mover having a power take-off, said attachment comprising a fluid-operated implement, a support frame carrying said implement, a pump for energising operating fluid for said implement, a reservoir for the operating fluid, a control valve for controlling the operation of said implement, fluid lines operatively interconnecting said pump, said reservoir, said control valve and said implement and completing a fluid circuit for operating said implement, said fluid circuit carried entirely by said support frame, said support frame adapted to be detachably secured to the chassis frame of the vehicle, means for securing said support frame remote from said implement to the chassis frame, a member for reacting upwardly on the chassis frame, said member carried by said support frame intermediate said securing means and said implement, a jack carried by said support frame, said jack arranged to engage the ground at a point lying outside the wheel-base of the vehicle, and said pump adapted to be driven by the power take-off when said support frame is secured to the chassis frame of the vehicle.

2. An attachment for a dumper which is provided with a chassis frame, a detachable skip, road wheels and a prime mover having a power take-off, said attachment comprising an implement, a fluid-operated motor for actuating said implement, a support frame carrying said implement, a pump for energizing operating fluid for said fluid-operated motor, a power input shaft for said pump, a reservoir for the operating fluid, a control valve for controlling the supply of said energised operating fluid to said fluid-operated motor, fluid lines operatively interconnecting said pump, said reservoir, said control valve and said fluid-operated motor and completing a fluid circuit for actuating said implement, said fluid circuit carried entirely by said support frame, said support frame adapted to be detachably secured rigidly to the chassis frame of the dumper in place of the detachable skip, said pump carried by said support frame in a position such that said power input shaft is substantially aligned with said power take-off when the support frame is rigidly secured to said chassis frame, means for securing said support frame remote from said implement to the chassis frame, a member for reacting upwardly on the chassis frame, said member carried by said support frame intermediate said securing means and said implement, a jack carried by said support frame, said jack arranged to engage the ground at a point lying outside the wheel-base of the dumper whereby said jack will act through said support frame to stabilize the dumper and the implement as a single unit, and said pump adapted to be driven by the power take-off when said support frame is secured to the chassis frame of the dumper.

3. An attachment for a dumper which is provided with a chassis frame, a detachable skip, road wheels and a prime mover having a power take-off, said attachment comprising a back hoe, fluid-operated motors for actuating said back hoe, a support frame carrying said back hoe, a pump for energising operating fluid for said fluid-operated motors, a reservoir for the operating fluid, control valves for controlling the supply of said energised operating fluid to said fluid-operated motors, fluid lines operatively interconnecting said pump, said reservoir, said control valves and said fluid-operated motors and completing a fluid circuit for actuating said back hoe, said fluid circuit carried entirely by said support frame, said support frame adapted to be detachably secured to the chassis frame of the dumper in place of the detachable skip, means for securing said support frame remote from said back hoe to the chassis frame, a member for reacting upwardly on the chassis frame, said member carried by said support frame intermediate said securing means and said back hoe, a jack carried by said support frame, said jack arranged to engage the ground at a point lying outside the wheel-base of the dumper, and said pump adapted to be driven by the power take-off when said support frame is secured to the chassis frame of the dumper.

References Cited by the Examiner

UNITED STATES PATENTS

| | | | |
|---|---|---|---|
| 2,489,629 | 11/1949 | Ford | 214—140 |
| 2,695,071 | 11/1954 | Hupp | 180—19 |
| 2,846,094 | 8/1958 | Pilch | 214—131 |
| 2,979,215 | 4/1961 | Brisson | 37—117.5 |
| 3,003,651 | 10/1961 | Holopainen | 214—138 |

HUGO O. SCHULZ, *Primary Examiner.*

GERALD M. FORLENZA, *Examiner.*

A. GRANT, *Assistant Examiner.*